United States Patent
Petterson

(10) Patent No.: US 6,588,364 B1
(45) Date of Patent: Jul. 8, 2003

(54) TEATCUP LINER, A TEATCUP INCLUDING A TEATCUP LINER, AND A MILKING MEMBER

(75) Inventor: Torbjörn Petterson, Gnesta (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/979,648

(22) PCT Filed: Jun. 9, 2000

(86) PCT No.: PCT/SE00/01211

§ 371 (c)(1),
(2), (4) Date: Jan. 10, 2002

(87) PCT Pub. No.: WO00/76300

PCT Pub. Date: Dec. 21, 2000

(30) Foreign Application Priority Data

Jun. 10, 1999 (SE) .............................................. 9902186

(51) Int. Cl.⁷ .................................................. A01J 5/08
(52) U.S. Cl. ..................................... 119/14.47; 119/14.5
(58) Field of Search ........................... 119/14.47, 14.48, 119/14.49, 14.5, 14.51, 14.52, 14.53

(56) References Cited

U.S. PATENT DOCUMENTS

| | | | | |
|---|---|---|---|---|
| 766,846 A | * | 8/1904 | Sharples | 119/14.52 |
| 766,847 A | | 8/1904 | Sharples | |
| 1,486,182 A | * | 3/1924 | Frost | 119/14.16 |
| 2,621,626 A | * | 12/1952 | Harris et al. | 119/14.52 |
| 2,935,964 A | | 5/1960 | Pickavance et al. | |
| 3,973,521 A | * | 8/1976 | Duncan | 119/14.47 |
| 4,223,635 A | | 9/1980 | Akerman | |
| 4,441,454 A | * | 4/1984 | Happel et al. | 119/14.36 |
| 5,224,442 A | * | 7/1993 | Davies | 119/14.47 |
| 6,039,001 A | * | 3/2000 | Sanford | 119/14.47 |

FOREIGN PATENT DOCUMENTS

| | | |
|---|---|---|
| CH | 533416 | 3/1973 |
| DE | 4420321 | 12/1995 |

OTHER PUBLICATIONS

Derwent's Abstract of patent SU–649–374.

* cited by examiner

Primary Examiner—Charles T. Jordan
Assistant Examiner—John W. Zerr
(74) Attorney, Agent, or Firm—Hovey Williams LLP

(57) ABSTRACT

The invention refers to a teatcup liner (3), a teatcup (1) having teatcup shell (2) and such a teatcup liner (3), and a milking member with at least two such teatcups (1). The teatcup liner (3) includes a head portion (3*b*), which is provided at a first end of the teatcup liner, and a pipe portion (3*c*), which extends from the head portion to a second end along a longitudinal axis (z) of the teatcup liner and which defines an inner space (5) arranged to receive a teat of an animal. The longitudinal axis forms a center axis of the inner space. The head portion includes an opening (9), which is intended to permit the introducing of said teat into the inner space (5). The head portion (3*b*) consists of a first part (10), which extends from a first side of a plane including the longitudinal axis (z), and a second part (11), which extends from the other side of said plane and which is larger than the first part.

22 Claims, 4 Drawing Sheets

TEATCUP LINER, A TEATCUP INCLUDING A TEATCUP LINER, AND A MILKING MEMBER

THE BACKGROUND OF THE INVENTION AND PRIOR ART

The present invention refers to a teatcup liner intended to be mounted in a teatcup shell for forming a teatcup for a milking member, wherein the teatcup liner includes a head portion, which is provided at a first end of the teatcup liner, and a pipe portion, which extends from the head potion towards a second end along a longitudinal axis of the teatcup liner and which defines an inner space arranged to receive a teat of an animal, wherein the longitudinal axis forms a centre axis of the inner space, wherein the head portion includes an opening, which is intended to permit the introduction of said teat into the inner space, and wherein the head portion consists of a first part, which extends from a first side of a plane including the longitudinal axis, and a second part, which extends from the other side of said plane.

Furthermore, the invention refers to a teatcup for a milking member, including a teatcup shell and a teatcup liner as defined above.

The invention also refers to a milking member including at least two teatcups as defined above.

In connection with milking according to conventional technique, teatcups, which are intended to be applied to a teat of the animal to be milked, are used. Such teatcups includes a teatcup shell and a teatcup liner, which is provided in the teatcup shell and arranged to receive a teat in an inner space, wherein the teat is introduced through an opening in an upper part of the teatcup liner. Conventional teatcups and teatcup liners have a circular cross-sectional shape, wherein the upper part of the teatcup liner, the head portion, has a relatively large radial extension. Said opening is centrally provided in the head portion.

In connection with machine milking of cows, the udder shapes of the cow and the location of teats on the udder frequently causes problems. Older cows and cows, which recently birthed calves, frequently have a relatively large distance between the teats whereas the teats of younger cows frequently are located relatively close to each other, in particular the two rearward teats. Such closely located teats may be difficult to reach by the teatcup, which results in the attachment of the teatcups taking a long time. Furthermore, the teatcups, when they have been applied, will not hang straight downwardly from the udder but due to the abutment against each other, the teatcups will hang obliquely, which means that the teat is bent which in turn may be a hinder to free milk flow. Such an undesired bending of the teat may also appear due to the curved shape of the udder, i.e., the teat is normally never located at the most downward point of the udder but at a distance from the lowest point, i.e. the teat is hanging naturally somewhat obliquely outwardly from the curved udder wall. This bending of the teat most often appears when the teat has a large mutual distance.

SUMMARY OF THE INVENTION

The object of the present invention is to remedy the problems mentioned above. A more precise object is to provide a teatcup liner and a teatcup, which is easily applicable to a teat and which is adapted to the geometry of the teat and the udder in such a way that a free milk flow is ensured or in other words that the teat is not bent.

This object is obtained by the teatcup liner initially defined, which is characterised in that the second part is substantially larger than the first part. Due to the fact that a part of the head portion is reduced in relation to an other part, it is in a better way than previously possible to reach closely located teats by turning the two reduced head portions of two teatcups, which are intended for two closely located teats, towards each other. By such a head portion, the teatcups will in addition hang more straight downwardly than according to prior art, which reduces the risk of an unpermittedly great bending of the teat. Furthermore, by reducing a part of the head portion, possibilities are created for a more freely hanging teatcup also in the cases when the udder wall is curved upwardly, and consequently, a substantially free milk flow may be ensured. Preferably, the teatcup liner is designed in such a way that said opening has a centre point, which substantially coincides with the longitudinal axis, whereby the teat may extend substantially straight into the inner space of the teatcup liner.

According to an embodiment of the invention, the second part has a larger extension than the first part in a substantially radial direction with regard to the longitudinal axis. By this embodiment, application of the teatcups to two closely located teats is enabled in particular.

According to a further embodiment of the invention, the head portion includes, seen in the direction of the longitudinal axis, two approximately straight lateral borderlines, which extend substantially towards a common corner and form an angle to each other. By such a shape of the head portion, it is possible to adapt all, normally four, teatcups of a milking member to an udder where all teats are closely located. Advantageously, said corner is included by the first part.

According to a further embodiment of the invention, said opening has an oval shape seen in the direction of the longitudinal axis. In the case that the teat in spite of the measures defined above will be bent, such an oval shape of the opening will improve the milk flow through the teat, since the teat in the bend proper will obtain an oval cross-sectional shape, i.e. the shape of the opening is according to this embodiment adapted to the shape of the teat. Since the teat normally is bent inwardly towards a centre under the udder, the oval shape advantageously forms a major axis and a minor axis, which extends perpendicularly to the major axis, wherein the major axis is substantially parallel to said plane, or in other words the minor axis is substantially directed towards to common corner.

According to a further embodiment of the invention, the second part has a larger extension than the first part in a direction which is substantially parallel to the longitudinal axis. By this embodiment, especially the application of the teatcups to teats which are located on an udder area which has an upward curvature is improved. Advantageously, the head portion may have an end wall, through which said opening extends and which is inclined with regard to the longitudinal axis, wherein the end wall is inclined in such a way that the end wall of the first part is located more closely to the second end than the end wall of the second part. Preferably, means are arranged to define at the most two possible rotary positions to the teatcup liner in relation to the teatcup shell when the teatcup liner is mounted in the teatcup shell.

Furthermore, the object defined above is obtained by the initially defined teatcup, which is characterised in that the second part is larger than the first part. In a manner corresponding to the one of the above defined teatcup liner, an adaptation of the shape to the shape of the udder and the location of the teats on the udder is obtained by such a teatcup. Advantageously, such a teatcup shell, seen in a cross-section along the longitudinal axis, may include two substantially straight lateral borderlines, which extend substantially towards a common corner and form an angle to each other. In such a way, the teatcups of a milking member may be positioned closer to each other than according to prior art.

The object is also obtained by the milking member initially defined, which is characterised in that the teatcups are connected to the teatcup claw, in such a way that the first part of each of said teatcups faces a centre line, extending through the teat cup claw, at least when the milking member is attached to an animal to be milked.

The object is also obtained by the teatcup liner initially defined, which is characterised in that said opening has an oval shape seen in the direction of the longitudinal axis.

The object is also obtained by the teatcup liner initially defined, which is characterised in that the head portion has an end wall, through which said opening extends and which is inclined with regard to the longitudinal axis.

BRIEF DESCRIPTION OF THE DRAWINGS

The invention is now to be explained more closely by means of embodiments described as examples and with reference to the drawings attached, in which FIG. 1 discloses a longitudinal section through a teatcup with a teatcup liner according to an embodiment according to the invention, FIG. 2 discloses a view from above of the teatcup liner in FIG. 1, FIG. 3 discloses a cross-sectional view along the line III—III in FIG. 1, FIG. 4 discloses a cross-sectional view along the line IV—IV in FIG. 1, FIG. 5 discloses a view from above of a milking member with four teatcups according to FIG. 1, FIG. 6 discloses a view along the line VI—VI in FIG. 5.

DETAILED DESCRIPTION OF DIFFERENT EMBODIMENTS OF THE INVENTION

Figure 1:
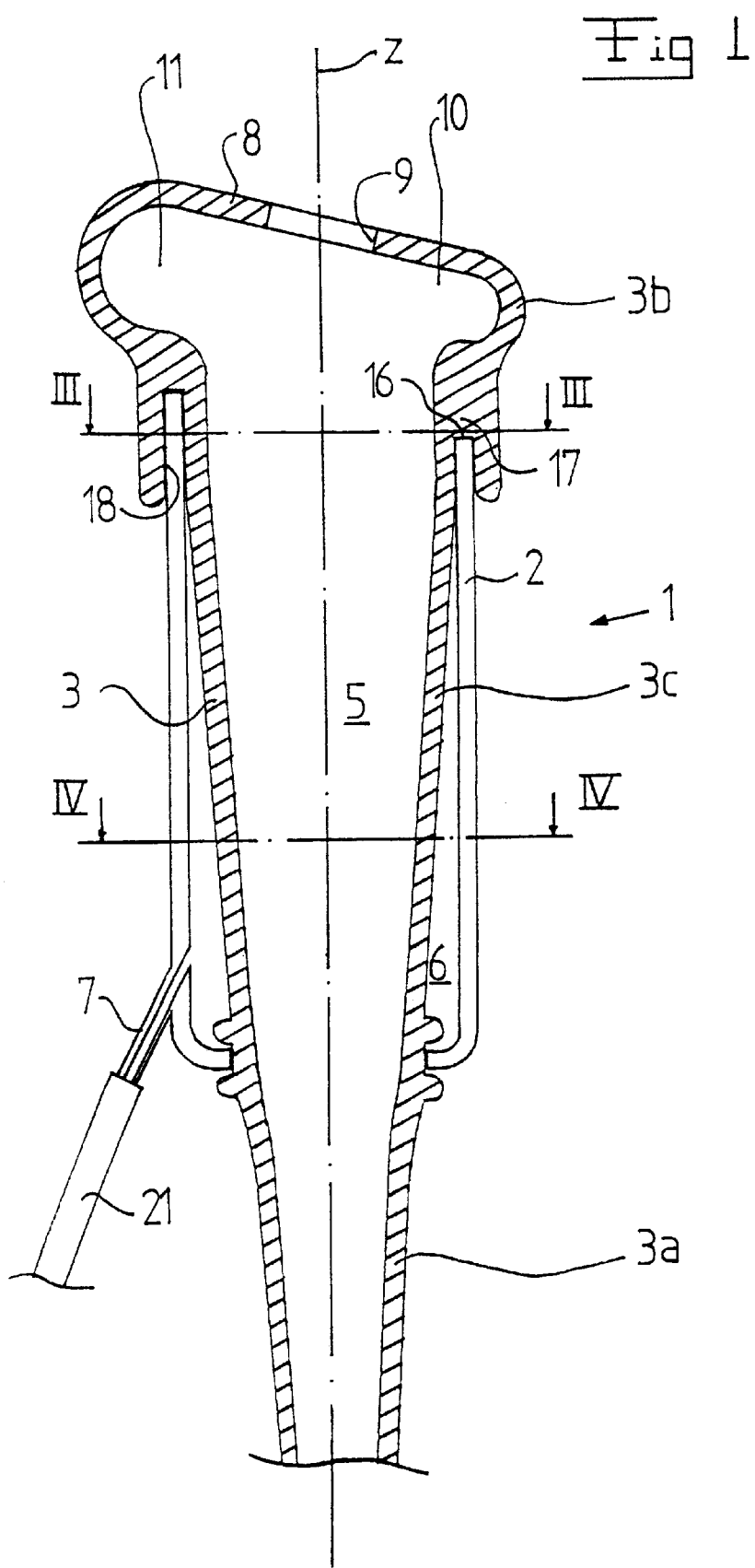

With reference to FIGS. 1–4 there is disclosed a teatcup 1, which includes a teatcup shell 2 and a teatcup liner 3 which is mounted in the teatcup shell and extends through the teatcup shell 2 from a first end to a second end. In the following, the first end will designate the upper end since this end is directed upwardly when the teatcup 1 is applied to a teat and the second end is designated the lower end. Furthermore, the teatcup liner 3 extends from the second end and forms a short milk conduit 3a between the teatcup 1 and the teatcup claw 4, see FIG. 6. Furthermore, the teatcup liner 3 includes a head portion 3b, which is provided at and above the upper end of the teatcup shell 2, and a pipe portion 3c which extends from the head portion 3b to the milk conduit 3a. The pipe portion 3c is thus enclosed in the teatcup shell 2 and forms an inner space 5, which is arranged to receive a teat of an animal. Between the teatcup shell 2 and the pipe portion 3c, a so called pulsation chamber 6 is formed, which, via a pulse nipple 7, is arranged to be subjected to a cyclically alternating pressure, by which the pipe portion 3c will describe a pulsating movement in a manner known per se. The teatcup liner 3 has a longitudinal axis z, which extends substantially parallel to the walls of the teatcup shell 2 and which forms a centre axis of the inner space 5.

The head portion 3b includes an upper limiting wall 8, which has an opening 9 intended to permit the introducing of the teat into the inner space 5. The longitudinal axis z also extends through the opening 9, i.e. the opening 9 has a centre point which substantially coincides with the longitudinal axis z.

Figure 5:
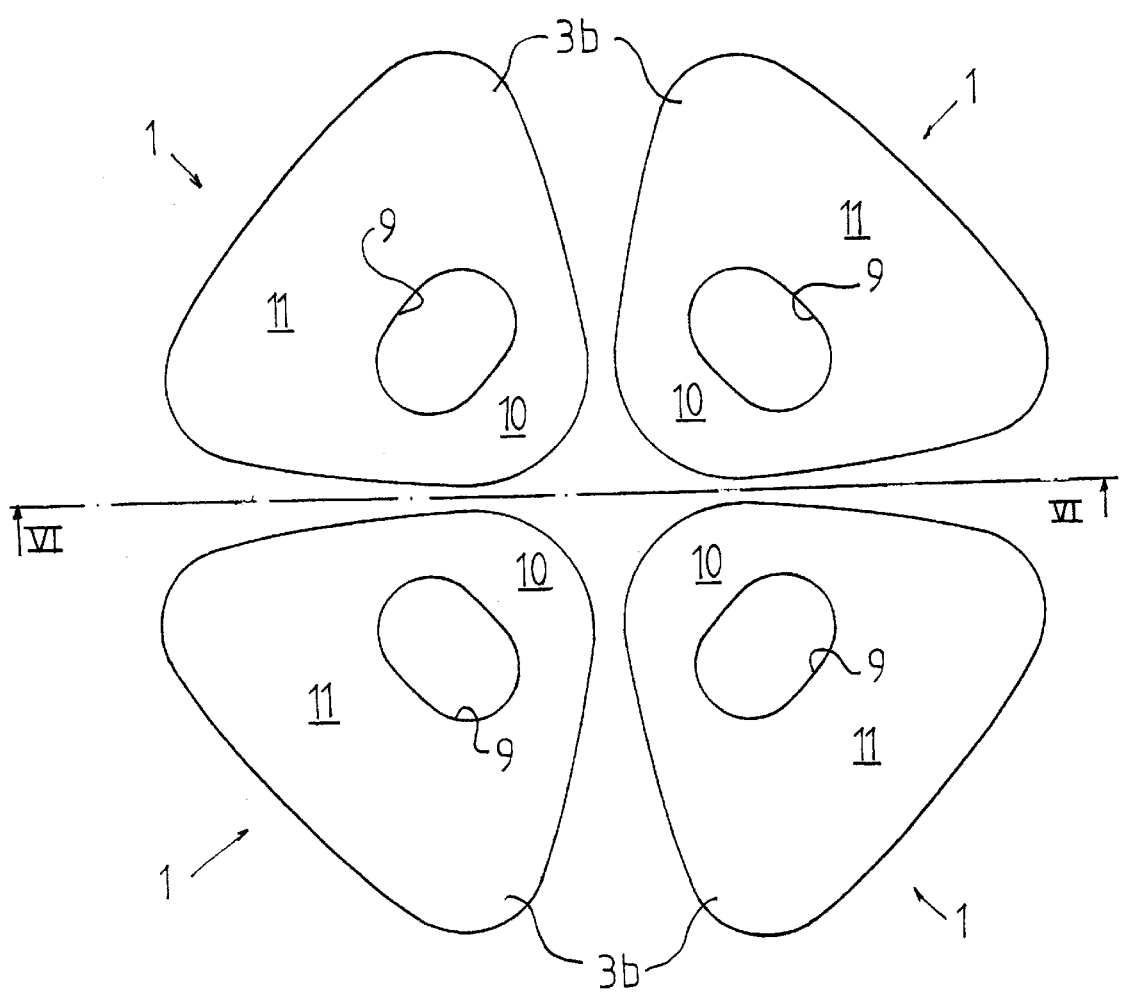

The head portion 3b consists of a first part 10, which extends from a first side of a plane a including the longitudinal axis z, and a second part 11, which extends from the other side of said plane a. Consequently, the plane a extends through the teatcup 2 and the inner space 5. As appears from FIGS. 1 and 2, the first part 10 is substantially smaller than the second part 11. In particular, the second part 11 has a larger extension than the first part 10 in a substantially radial direction with regard to the longitudinal axis z. This means that two or several teatcups 1 may be brought closer to each other, if they are provided in such a way in relation to each other that the first part 10 faces the first part 10 of an adjacent teatcup 1, compare FIG. 5.

Furthermore, the head portion 3b, seen in the direction of the longitudinal axis z, includes two approximately straight lateral border lines 12, 13, which extend towards a substantially common imaginary corner and which form an angle to each other. In the embodiment disclosed, the lateral border lines 12, 13 have a slightly curved shape but still a clearly recognisable extension direction towards said common corner. As appears from FIG. 2, said corner is included by the first part 10 of the head portion 3b. Such an embodiment facilitates significantly the movement of three or more, especially four, teatcups 1 more closely to each other in such a way that a set of teatcups 1 is suitable to be applied to four closely located teats of an animal.

Figure 3:
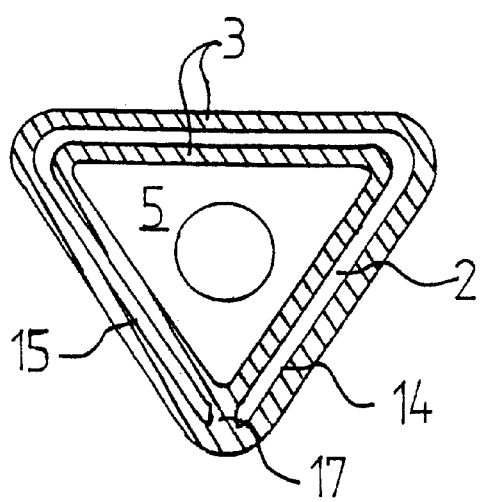
Figure 4:
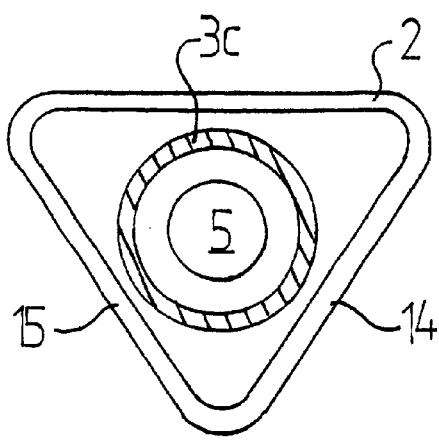

As appears from FIGS. 3 and 4, also the teatcup shell 2, seen in a cross-section along the longitudinal axis z, has at least two substantially straight lateral border lines 14, 15, which extend towards a substantially common corner and which form an angle to each other. By such a cross-sectional shape of the teatcup shell 2, the teatcup liner 3, which is elastic but still has a certain rigidity and a cross-sectional shape corresponding to the cross-sectional shape of the teatcup shell 2, will only be mountable in one single rotary position in the teatcup shell 2. By a less marked cross-sectional shape of the teatcup shell 2, it is possible to design the pipe portion 3c of the teat cup liner 3 with a substantially circular cross-sectional shape which is deformed when the teatcup liner 3 is mounted in the teacup shell 2. Thereby, the teatcup liner 3 and the teatcup shell 2 may include second means for defining one or at the most two possible rotary positions to the teatcup liner 3 in relation to the teatcup shell 2. Such means may for instance include a recess 16 in the upper end of the teatcup shell 2 and a portion of material 17, which extends between two limiting walls of a surrounding recess 18, which is arranged to receive the upper end of the teatcup shell 2 when the teatcup liner 3 is mounted in the teatcup shell 2. Thereby, the portion of material 17 is introduced into the recess 16 and locks the teatcup liner 3 in the rotary direction in relation to the teatcup shell 2.

As appears in particular from FIG. 1, the second part 11 has a substantially larger extension than the first part 10 in a direction which is substantially parallel to the longitudinal axis z, i.e. the second part 11 extends to a higher position than the first part 10 when the teatcup 1 is applied to a teat. The upper limiting wall 8 of the teatcup liner 1, i.e. the end wall of the head portion 3b, is thus inclined with regard to the longitudinal axis z in such a way that the limiting wall 8 of the first part 10 is located more closely to the second end of the teatcup shell 2 than the limiting wall 8 of the second part 11. The liming wall 8 thus is inclined downwardly towards the corner mentioned above. By such an inclined limiting wall 8, the teatcup 1 may hang substantially straight downwardly beneath an udder which is curved upwardly in the area surrounding the teat in question.

Figure 2:
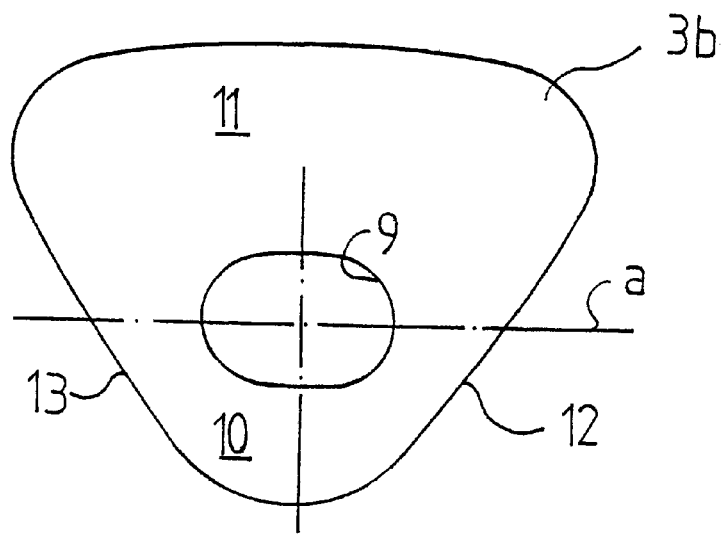

From FIG. 2 also appears that the opening 9 has an oval or elongated shape seen in the direction of the longitudinal axis z. The oval shape forms a major axis and a minor axis which extends perpendicular to the major axis. The major axis is substantially parallel and coincides with said plane a, while the minor axis extends in a direction towards the corner mentioned above. By such an oval shape of the opening 9, the teatcup 1 is adapted to a teat which may be somewhat bent in the area of the teat, which is located at the level of the opening 9.

Figure 6:
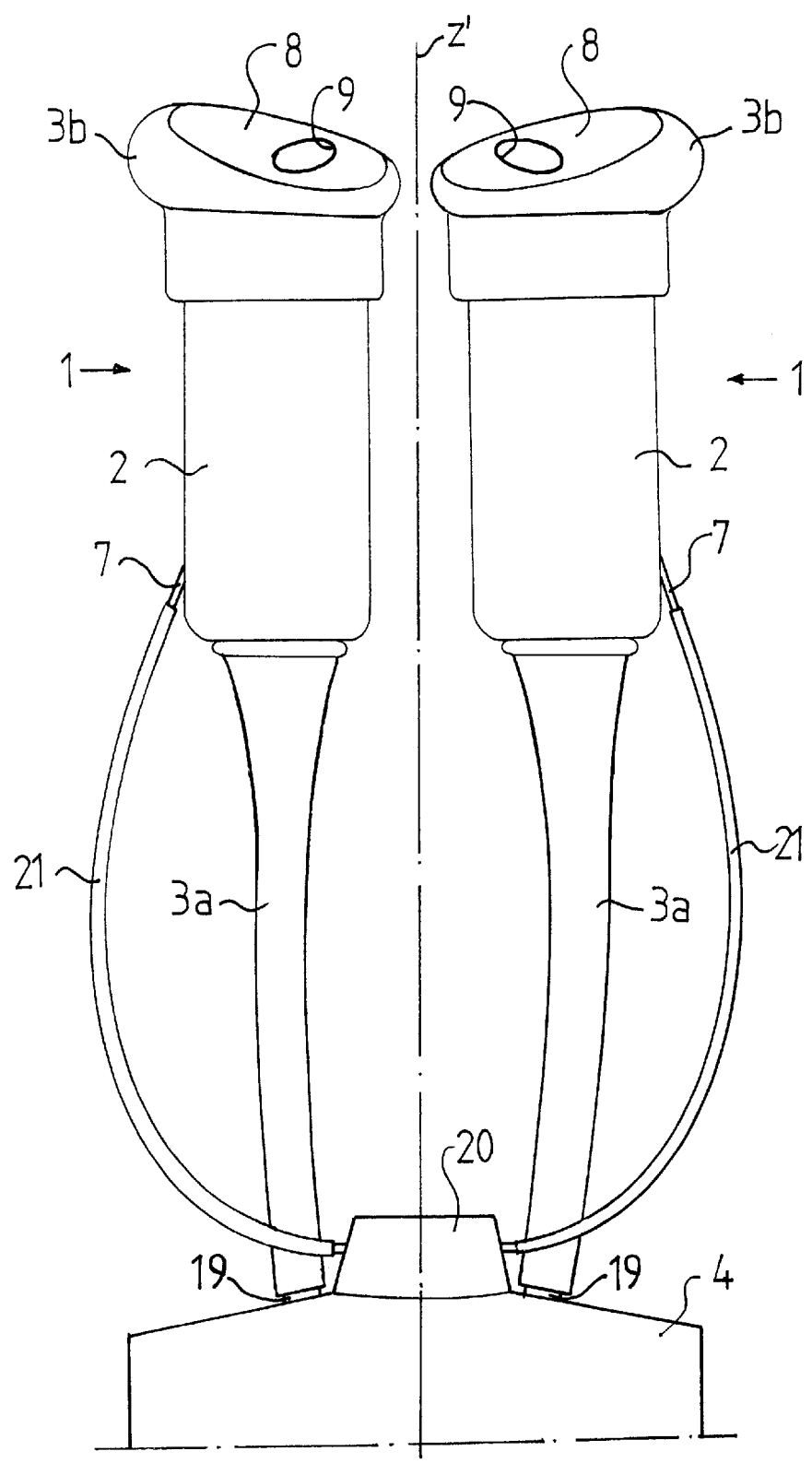

FIG. 6 discloses parts of a milking member and two teatcups 1, which are connected to the teatcup claw 4 via the short milk conduits 3a of each of the teatcups 1. The milk conduits 3a are connected to a respective inlet nipple 19 of the teatcup claw 4. Furthermore, each teatcup 1 is connected to a distributing member 20 via a respective short pulse conduit 21 which connects to the pulse nipple 7. The teatcups 1 are connected to the teatcup claw 4 in such a way that the first part 10 of each of the teatcups 1 faces a centre line z' which extends through the teatcup claw 4 at least when the milking member is attached to an animal to be milked.

The present invention is not limited to the embodiment disclosed but may be varied and modified within the scope of the following claims.

Although the teatcup disclosed includes a larger extension of the second part in radial as well as axial direction, and an oval hole, it is to be noted that the invention also refers to a teatcup or a teatcup liner having only one or two of these embodiments defined above.

The disclosed limiting wall 8 has a substantially plane extension in the embodiment disclosed. However, it is to be noted that this limiting wall 8 may be somewhat curved and preferably. concave inwardly towards the opening 9.

What is claimed is:

1. A teatcup liner adapted to be mounted in a teatcup shell for forming a teatcup for a milking member, the teatcup liner comprising:
   a head portion which is provided at a first end of the teatcup liner; and
   a pipe portion which extends from the head portion to a second end along a longitudinal axis (z) of the teatcup liner and which defines an inner space arranged to receive a teat of an animal,
   wherein the longitudinal axis (z) forms a center axis of the inner space,
   wherein the head portion includes an opening which is adapted to permit introduction of the teat into the inner space, and
   wherein the head portion includes a first part which extends from a first side of a plane (a) including the longitudinal axis (z) and a second part which extends from the other side of the plane, wherein the second part is substantially larger than the first part.

2. A teatcup liner according to claim 1, wherein said opening has a center point which substantially coincides with the longitudinal axis (z).

3. A teatcup liner according to claim 1, wherein the second part has a larger extension than the first part in a substantially radial direction with regard to the longitudinal axis (z).

4. A teatcup liner according to claim 1, wherein the head portion, seen in the direction of the longitudinal axis (z), includes two approximately straight lateral border lines which extend towards substantially one common corner and form an angle to each other.

5. A teatcup liner according to claim 4, wherein said corner is included by the first part.

6. A teatcup liner according to claim 1, wherein said opening has an oval shape seen in the direction of the longitudinal axis (z).

7. A teatcup liner according to claim 6, wherein the oval shape forms a major axis and a minor axis which extends perpendicular to the major axis, wherein the major axis is substantially parallel to said plane (a).

8. A teatcup liner according to claim 1, wherein the second part has a substantially larger extension than the first part in a direction which is substantially parallel to the longitudinal axis (z).

9. A teatcup liner according to claim 8, wherein the head portion (3b) has an end wall through which said opening extends and which is inclined with regard to the longitudinal axis (z).

10. A teatcup liner according to claim 9, wherein the end wall is inclined in such a way that the end wall of the first part is located closer to the second end than the end wall of the second part.

11. A teatcup liner according to claim 1, including means arranged to define at the most two possible rotary positions for the teatcup liner in relation to the teatcup shell, where the teatcup liner is mounted in the shell.

12. A teatcup for a milking member, comprising:
   a teatcup shell; and
   a teatcup liner which is mounted in the teatcup shell,
   wherein the teatcup liner includes a head portion which is provided at a first end of the teatcup liner, and a pipe portion which extends from the head portion to a second end along a longitudinal axis (z) of the teatcup liner and which defines an inner space arranged to receive a teat of an animal,
   wherein the longitudinal axis forms a center axis of the inner space;
   wherein the head portion includes an opening which is adapted to permit introduction of said teat into the inner space, and
   wherein the head portion includes a first part which extends from a first side of a plane (a) including the longitudinal axis (z), and a second part which extends from the other side of said plane (a) including the longitudinal axis (z),
   wherein the second part is substantially larger than the first part.

13. A teatcup according to claim 12, wherein said opening has a center point which substantially coincides with the longitudinal center axis (z).

14. A teatcup according to claim 12, wherein the second part has a larger extension than the first part in a substantially radial direction with regard to the longitudinal axis (z).

15. A teatcup according to claim 12, wherein the head portion, seen in the direction of the longitudinal axis (z), includes two substantially straight lateral border lines which extend towards substantially one common corner and form an angle to each other.

16. A teatcup according to claim 15, wherein said corner is included by the first part.

17. A teatcup according to claim 12, wherein the teatcup shell, seen in a cross-section along the longitudinal axis (z), includes two substantially straight lateral borderlines which extend towards substantially a common corner and form an angle to each other.

18. A teatcup according to claim 12, including means arranged to define at the most two possible rotary positions for the teatcup liner in relation to the teatcup shell.

19. A milking member comprising:

a teatcup claw; and at least two teatcups according to claim 12, wherein the teatcups are connected to the teatcup claw in such a way that the first part of each of said teatcups faces a center line (z') which extends through the teatcup claw, at least when the milking member is attached to an animal to be milked.

20. A substantially non-rigid teatcup liner adapted to be mounted in a teatcup shell for forming a teatcup for a milking member, the teatcup liner comprising:

a head portion which is provided at a first end of the teatcup liner; and a pipe portion which extends from the head portion to a second end along a longitudinal axis (z) of the teatcup liner and which defines an inner space arranged to receive a teat of an animal, wherein the head portion includes an opening which is intended to permit introduction of said teat into the inner space, wherein the head portion includes a first part which extends from a first side of a plane (a), including the longitudinal axis (z), and a second part which extends from the other side of said plane (a), and wherein said opening has an oval shape seen in the direction of the longitudinal axis (z) wherein the oval shape forms a major axis and a minor axis which extends perpendicularly to the major axis, wherein the major axis is substantially parallel to said plane (a).

21. A teatcup liner according to claim 20, wherein said opening has a center point which substantially coincides with the longitudinal axis (z).

22. A teatcup liner adapted to be mounted in a teatcup shell for forming a teatcup for a milking member, said teatcup liner comprising:

a head portion which is provided at a first end of the teatcup liner; and a pipe portion which extends from the head portion to a second end along a longitudinal axis (z) of the teatcup liner and which defines an inner space arranged to receive a teat of an animal, wherein the longitudinal axis forms a center axis of the inner space, wherein the head portion includes an opening which is adapted to permit introduction of the teat into the inner space, wherein the head portion includes a first part which extends from a first side of a plane (a) including the longitudinal axis (z), and a second part which extends from the other side of said plane (a), wherein the head portion has an end wall through which said opening extends and which is inclined with regard to the longitudinal axis (z), and wherein the end wall is inclined in such a way that the end wall of the first part is located closet to the second end than the end wall of the second part such that in use, the first part is oriented more closely to the center of the udder and the second part is oriented opposite thereto to more closely conform to the geometry of the teat and udder.

\* \* \* \* \*